Feb. 15, 1966   H. R. FEHLING ETAL   3,234,917
SEAL FOR RESERVOIRS OF WRITING AND OTHER DISPENSING INSTRUMENTS
Filed Feb. 1, 1960   3 Sheets-Sheet 1
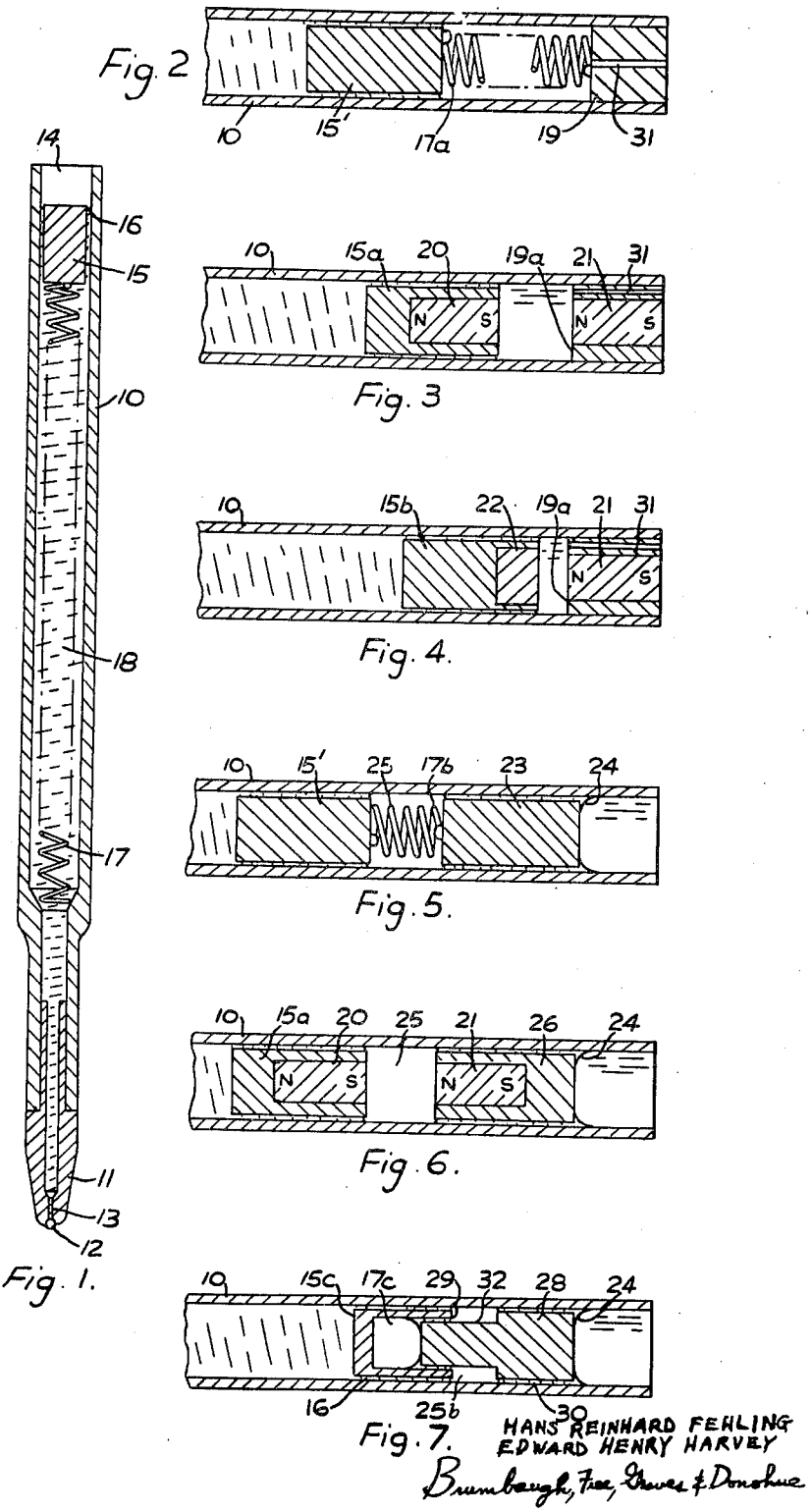

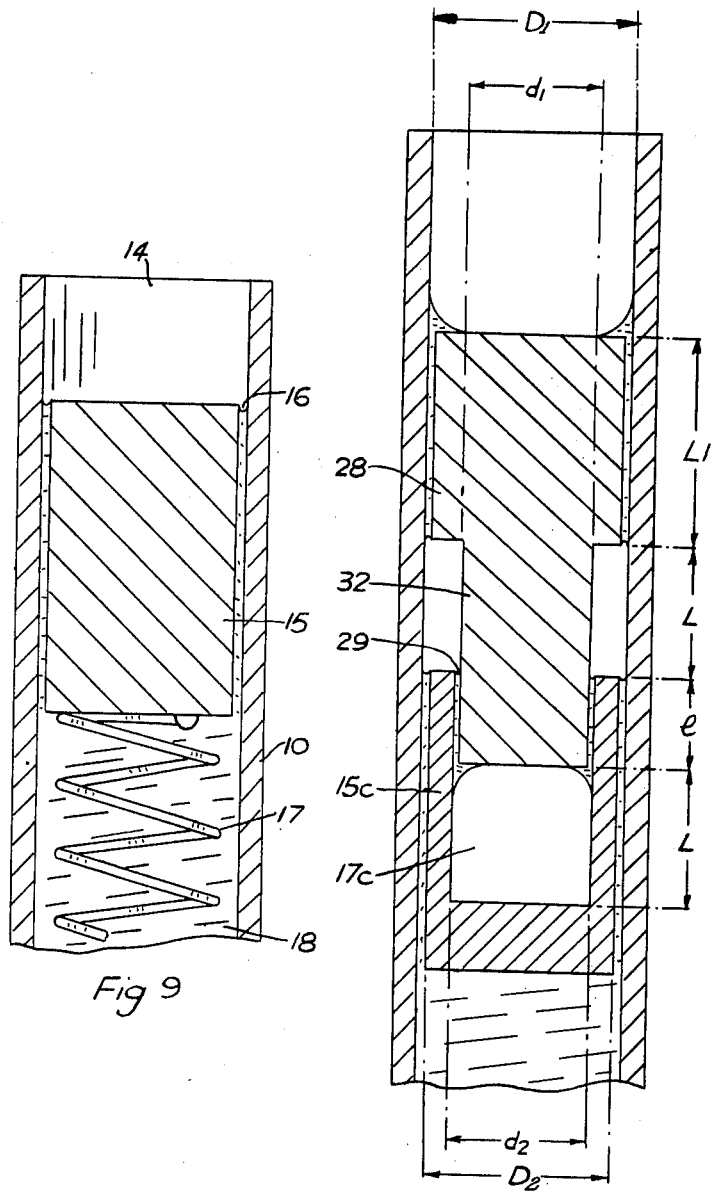

HANS REINHARD FEHLING
EDWARD HENRY HARVEY

United States Patent Office 3,234,917
Patented Feb. 15, 1966

3,234,917
SEAL FOR RESERVOIRS OF WRITING AND
OTHER DISPENSING INSTRUMENTS
Hans Reinhard Fehling, Zug, Switzerland, and Edward
Henry Harvey, London, England, assignors to I.R.C.
Limited, London, England, a company of Great Britain
Filed Feb. 1, 1960, Ser. No. 5,872
Claims priority, application Great Britain, Feb. 6, 1959,
4,202/59
11 Claims. (Cl. 120—42.4)

This invention relates to seals for reservoirs for writing or other dispensing instruments of the type including a solid follower or piston at the rear end of a column of liquid with a conduit portion of the reservoir wherein the piston forms an easy sliding fit in the conduit so as to move along it as the liquid is withdrawn from the reservoir In the foregoing definition the expression "solid" follower is used in the sense that such a follower does not wet the reservoir or conduit walls like a "fluid" or "pasty" follower and, therefore, has or forms a clearance space between itself and the walls, however small. This clearance is not necessarily uniform and is normally filled partly or wholly with the dispensing liquid or with a sealing liquid or lubricant.

The invention is concerned chiefly with seals for reservoir conduits of greater-than-capillary size which, for the purpose of the present description, is defined as 3.5 mm. internal diameter (or equivalent cross-section), and more particularly with seals for such conduits having about 5 or 6 mm. bore in which capillary forces are not large enough to prevent the escape of liquid from the reservoir under the influence of gravity or other external forces to which the instrument may be subjected in normal use.

Although the invention is especially applicable to reservoirs for ball-point writing instruments it is also applicable to the reservoirs of fountain pens, stylographic pens, and like writing instruments, as well as other instruments dispensing liquids. In fact, the sealing piston can be used in any form of liquid reservoir having a vent or conduit open to the atmosphere or surrounding environment wherein the vent or opening must be plugged to prevent leakage while at the same time permitting changes in the level of the liquid in the reservoir.

In a tubular reservoir of greater-than-capillary size which has a conventional solid follower piston, one end or face of the follower piston is immersed in the liquid while the other end or face (usually subject to atmospheric pressure) emerges from it with the result that at the latter end a small meniscus is formed at the surface of the thin annulus of liquid filling the clearance space between the piston periphery and the reservoir wall.

If this meniscus is concave the resulting capillary forces produce a decrease in the pressure in this annulus of liquid below that of the atmosphere or other environment. In consequence there is a pressure difference between the two faces or ends of the follower piston which, even if the latter has the same bulk density (apparent specific gravity) as the liquid, tends to force the follower into the liquid.

As a result, a conventional follower moves into the liquid so as to extrude the liquid through the clearance space. This effect is particularly apparent when the reservoir is lying on its side, since in this condition the portion of the liquid annulus on the lower side of the follower is subjected to a hydrostatic head which adds to the capillary forces tending to force the liquid past the follower. Consequently, in this position, seepage of liquid does occur in conventional larger than capillary size reservoirs having solid followers.

Accordingly, it is an object of this invention to provide a larger-than-capillary size reservoir having a solid follower wherein seepage of liquid past the follower is effectively prevented.

Another object of the invention is to provide a reservoir of the above character wherein seepage of liquid past the follower is prevented in every orientation of the reservoir.

These and other objects of the invention are accomplished by providing a larger-than-capillary size reservoir including a solid follower and also including urging means effective in every orientation of the reservoir to apply a force to the follower in the longitudinal direction of the reservoir tending to urge the follower out of the liquid in the reservoir. The magnitude of the force applied by the urging means is sufficient to balance, in every orientation, all the other forces which tend to drive the follower into the liquid but is insufficient, in any orientation, to expel the follower from the liquid.

In certain embodiments of the invention, the urging means comprises a spring which extends longitudinally in the reservoir from one end thereof to the follower, the spring being, in one case, a compression spring and in another instance a tension spring. Other embodiments of the invention utilize the permanent magnetic means for urging the follower, while in still other embodiments a second piston is disposed adjacent to the follower outside the liquid and the two pistons are urged together by spring means, magnet means, or pneumatic means. In these embodiments, a pocket of air in contact with the fluid meniscus surrounding the follower and is trapped between the two pistons so that the means urging the two pistons together tends to force the follower out of the liquid.

In order that the invention may be better understood reference will now be made to the accompanying drawings in which:

FIGS. 1–7 are longitudinal sections through ball-point writing instruments and illustrate seven embodiments of the invention;

FIG. 8 is a view on a larger scale of the follower assembly shown in FIG. 7;

FIG. 9 is an enlarged view of the follower assembly shown in FIG. 1; and

Figure 10:
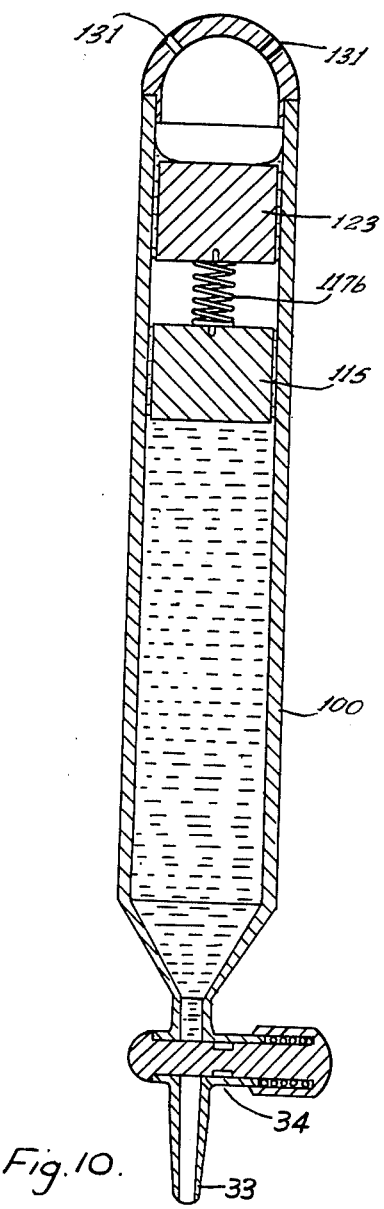
FIG. 10 shows another form of reservoir utilizing the seal of the invention.

All of these figures are largely diagrammatic and are not to scale.

In the typical embodiment of the invention shown in FIG. 1 the illustrated writing instrument has an ink reservoir 10 (which may be made of transparent material) terminating in a writing extremity 11 in which a writing ball 12 is rotatably housed in a socket or housing. The ball is supplied with ink 18 from the interior of the reservoir 10 by means of a feed duct 13. The construction of the socket is not illustrated but suitable constructions are shown in United States Patent No. 2,390,636. The bore of the reservoir 10 is of circular cross-section, although this need not necessarily be so, and its interior surface is smooth. It is of greater-than-capillary size, e.g., being about 5 mm. internal diameter.

The rear end 14 of the reservoir is open to atmosphere. To prevent ink from escaping there is provided a piston-like follower 15 of smooth cylindrical form which is a relatively close sliding fit in the bore of the reservoir such that, as the ink is used up in writing and the ink content of the reservoir diminishes, the follower progresses towards the writing extremity 11. For the purpose of illustration the narrow gap or clearance between the external peripheral surface of the follower and the surrounding interior surface of the reservoir wall is exaggerated so as to show that this gap is occupied by a thin annulus of liquid (ink, or a sealing liquid—a sealing liquid may be used to fill the annulus if the ink itself is of a quick-drying nature) and that this annulus of liquid terminates at or adjacent to the outer end of the follower in a strong and stable concave annular meniscus 16. Means are provided exerting a force acting on the follower in a direction longitudinal of the tubular reservoir and tending to thrust the follower out of the ink, regardless of the attitude of the reservoir itself, and in the embodiment of FIG. 1 this means comprises a compression spring 17 within the reservoir extending from an abutment at the forward end of the reservoir to the forward end of the follower 15. Thus, the abutment constitutes an element separate from the follower with respect to which the follower is movable and the spring constitutes a means applying a force between that element and the follower. It is preferable for the bulk density of the follower to be approximately the same as that of the liquid in which it is immersed, in order that there is no buoyancy or sinking effect on the follower. This insures that the aforesaid force on the follower is equally effective in all attitudes of the reservoir. This force balances the effect of the capillary pressure (depression) which acts upon the immersed end of the follower and tends to draw said follower into the ink.

This force exerted by the spring 17 must not be so great as to overcome the capillary forces mentioned and thereby push the follower completely out of the liquid in which it is immersed. When determining the maximum permissible force, allowance should be made for the transverse displacement of the follower. The most unfavorable case occurs when the rear of the follower touches the interior wall of the reservoir on one side, thus producing on the other side of the reservoir a maximum gap or clearance. The strongest meniscus in this gap has a radius of curvature equal to one-half of the difference in diameter between the reservoir and the follower. Hence, the maximum permissible force must not overcome the maximum capillary forces relative to said maximum gap mentioned. At the same time, if the force is provided by a spring the rate of change of the force applied with changes in the compression of the spring must be as low as possible in order that the maximum permissible thrust is not exceeded when the reservoir is approaching the empty condition.

On the other hand, the force of the spring 17 should have a minimum value. If it is insufficient the meniscus 16 is not strong enough to support the hydrostatic head of ink which prevails when the reservoir is lying on its side.

In order to determine the maximum and minimum forces to be applied by the spring 17 or any other urging means to the follower the forces which the spring is to oppose must be determined. This can be done by using the following formulae for calculating the maximum and permissible pressure differentials across the annular meniscus formed by the ink surrounding the follower:

$$(Po-Pi) \text{ max.} = T/gd - \tfrac{1}{2}(D+2d)$$
$$(Po-Pi) \text{ min.} = \tfrac{1}{2}W(D+2d)$$

in which $Po$ is the gas pressure (in cm. of water) acting on the rear face of the follower, i.e., the atmospheric pressure in the case of FIGS. 1, 2, 3 and 4, and greater than atmospheric pressure in the case of FIGS. 5, 6, and 7, $Pi$ is the average ink pressure in the reservoir, which in the case of FIGS. 1, 2, 3 and 4 is lower than, but in the case of FIGS. 5, 6 and 7, is substantially equal to the atmospheric pressure (in cm. of water), $T$ is the surface tension of the ink (in dynes/cm.), $W$ is its density (in gr./cc.), $D$ is the diameter of the follower (in cm.), $d$ is the average radial clearance between the follower and the reservoir walls (in cm.), and $g$ is the gravitational constant (981 cm./sec.$^2$).

The forces acting on the ink follower and corresponding to the above pressures can simply be derived from the latter by multiplying them with the cross-sectional area of the follower. The spring (or equivalent) force should therefore remain within the limits of the maximum and minimum forces calculated in the above manner.

It also follows from the above that the difference between maximum and minimum permissible forces become smaller as the diameter of the reservoir increases. The absolute limit is given by $$D \text{ max.} = T/Wgd \text{ min.}$$

and actually reaches the order of 25 cm. for normal liquids. But, as a margin for safety must be allowed for the actual practical limit is about 10 cm.

Generally, it will be desirable to choose a spring or other device having characteristics nearer the minimum value in order to limit the degree to which the pressure in the reservoir is reduced below atmospheric pressure.

The following details are given by way of example:

| | |
|---|---|
| Reservoir diameter _____ mm__ | 5.0 |
| Follower diameter _____ mm__ | 4.9 |
| Radial clearance _____ mm__ | 0.05 |
| Maximum gap _____ mm__ | 0.1 |
| Density _____ gr./cc__ | 1.1 |
| Maximum permissible pressure differential _____ cm. of water__ | 6.1 |
| Minimum desirable pressure differential _____ cm. of water__ | 0.55 |
| Surface tension _____ dynes/cm__ | 30 |
| Maximum permissible force _____ gr__ | 1.15 |
| Minimum desirable force _____ gr__ | 0.1 |

Good results have been obtained with a compression spring exerting a force from 0.1 gr. when the reservoir is full to 0.2 gr. when the reservoir is empty.

FIG. 9 is an enlarged view of a portion of FIG. 1 illustrating the attachment of the compression spring 17 which is immersed in the liquid container in the reservoir 10. This spring reacts against a suitable fixed abutment in the reservoir as shown in FIG. 1. Suitable dimensions and spring forces for the spring 17 are given above.

The method of assembly is as follows. The reservoir 10, without the writing extremity 11, is held with the rear end 14 uppermost and the spring 17 and the follower 15 are inserted. The weight of the follower partly or wholly compresses the spring. Ink is then pumped into the reservoir via the open lower end until the desired quantity is contained therein, the rising ink level in the reservoir lifting the follower 15 as a piston. The writing extremity is then attached to the reservoir.

FIG. 2 shows an arrangement which functions in a similar fashion to that shown in FIG. 1, except that the compression spring is replaced by a tension spring 17a, which is anchored both to the outer end of a follower 15' and to the inner end of a vented end-plug 19 having an air-vent 31. The end-plug 19 is rigidly attached to the rear end of the reservoir.

The dimensions and spring forces for a suitable instrument according to FIG. 2 may be those previously given for FIG. 1.

The method of assembly is as follows. The spring 17a is attached at its respective ends to the follower 15' and the end-plug 19 and this assembly is inserted into the reservoir 10 and the end-plug 19 is fastened into the rear end of the reservoir. In the upright position the weight of the follower 15' causes the spring 17a to extend so that the follower descends towards the lower end of the reservoir. Filling is then carried out as described with reference to FIG. 1.

FIGS. 3 and 4 show magnetic arrangements in which the force is applied to the follower by means of one or more permanent magnets. In these cases the force on the follower varies inversely as the square of the distance between the attracting members. In FIG. 3 these members are two magnets with adjacent (unlike) poles attracting; one magnet 20 mounted in the follower 15a and the other magnet 21 mounted in the fixed (vented) end-plug 19a. In FIG. 4 a similar magnet 21 is mounted in the end-plug 19a, this magnet exerting a force of attraction on a magnetically attractable insert 22 of soft iron which is attached to the follower 15b.

Suitable dimensions for the reservoir and follower in FIGS. 3 and 4 may be specified above in connection with FIG. 1.

For a construction according to FIG. 3 suitable magnets have a diameter of 3 mm. and a length of 6 mm. The pole strength of such magnets may be sixteen unit poles. When the opposite (attracting) poles are separated by a gap of 5 mm. the force of attraction is approximately 1 gram weight.

The method of assembly is as follows. The follower 15a is inserted into the reservoir and the end-plug 19a then fixed in the rear end of the reservoir. With the rear end of the reservoir uppermost ink is then pumped into the reservoir via the lower end. The follower 15a is lifted by the rising ink column and the reservoir is considered to be full when the gap between the two magnets is between 5 and 6 mm.

The construction shown in FIG. 4 is basically similar to that shown in FIG. 3 except that one magnet is replaced by a slug 22 of soft iron. The force of attraction is less than in FIG. 3 and it therefore is necessary to have a final gap between the magnet and the soft iron slug 22 of between the magnet and the soft iron slug 22 of between 2 and 3 mm. The method of assembly is as described in relation to FIG. 3.

It may be pointed out that since the force of attraction diminishes with the square of the distance between attracting members, the constructions shown in FIGS. 3 and 4 are suited only to reservoirs of small length.

It is also to be pointed out that in the constructions shown in FIGS. 1–4 there is a capillary pressure (depression) throughout the ink column when the reservoir is lying on its side. The fact that the liquid in the reservoir is at a reduced pressure may be a slight disadvantage in a ball-point writing instrument which is intended to write in the horizontal attitude as air may be drawn into the reservoir, via the gap which exists between the writing ball and socket, if the ball is rotated when the reservoir is in the horizontal position.

The constructions shown in FIGS. 5, 6, and 7 eliminate this possibility. Each of them utilizes, as the element separate from the follower with respect to which the follower is movable, a secondary follower which moves freely in the reservoir together with the follower proper and which provides the abutment against which the means for exerting the necessary force upon the follower proper reacts. It is also to be pointed out that each of them incorporates means for applying, to the outer face of the meniscus in the clearance between the follower and the reservoir walls, a gas (or vapor) pressure tending to urge said meniscus into the gap but insufficient to rupture the seal afforded by the liquid in the gap.

In FIG. 5 the follower 15', which may be identical to the follower 15' shown in FIG. 2, is connected to a secondary follower 23 by a tension spring 17b which draws the two followers toward one another. The secondary follower 23 is surrounded by an annulus of liquid 24 forming a seal so that a pocket of air at greater than atmospheric pressure is trapped between the two followers.

Furthermore, as the trapped air pressure is above atmospheric pressure by an amount exactly equal in magnitude to the capillary pressure of the two annular menisci which form the boundaries of said trapped air, it can be shown that the ink in the reservoir is at atmospheric pressure when the reservoir is lying on its side. It is advisable to provide a moderate surplus of sealing liquid at the rear (atmosphere) end of the secondary follower 23. This is done in order that the secondary follower is not starved of liquid, should the wall of the reservoir retain a thin film of said liquid when this secondary follower moves along the reservoir. The same limitations apply to the force which acts on the follower (15, 15a, 15c respectively) as in FIGS. 1–4, but in FIGS. 5–7 this force does not vary with the amount of ink in the reservoir. However, the pressure and volume of the trapped air 25 vary with ambient temperature and pressure. Hence, it is important that the mechanical tension spring 17b which in FIG. 5 connects the follower proper 15' with the secondary follower 23 has a low rate of change of force with changes in the separation of the followers so that the annular menisci are not overcome by the pressure of the trapped air 25 rising unduly as a result of (say) a rise of ambient temperature. In a construction wherein the diameter of the reservoir is 5 mm. and the diameters of the follower and secondary follower are 4.9 mm. the tension spring 17b may have an initial free length of 5 mm. and a stiffness of say 1 gram weight per centimeter. The sealing liquid which surrounds the secondary follower 23 preferably has a surface tension substantially the same as that of the ink.

In assembly the tension spring 17b is firmly attached to the followers 15' and 23. The reservoir is filled with ink to the desired level and the writing extremity attached. The followers, connected by the tension spring, are inserted into the reservoir and the follower 15' then becomes immersed in the ink. The entire instrument as so far constructed is then placed in a pressure chamber at, for example, two atmospheres absolute pressure and the sealing liquid is deposited around the secondary follower 23. The instrument is then removed from the pressure chamber with the result that the air trapped at 25 expands to twice the volume which it occupied at two atmospheres. This extends the spring 17b from its original length of 5 mm. to 10 mm. in length, with the resulting tensile force of 0.5 gram weight. When assembled, the separation of the two pistons should be such as to prevent the two opposed menisci adjacent to the trapped air volume from joining under normal conditions of use.

Instead of a pressure chamber a cold chamber may be used.

In FIG. 6 a follower 15a, which is like that of FIG. 3, is equipped with a permanent magnet 20 and a secondary follower 26 is equipped with a permanent magnet 21 like the magnet in the plug 19 of FIG. 3. These two magnets draw the two followers toward one another. As a result, a pocket of air 25a at greater than atmospheric pressure is trapped between the two followers in the same manner as the pocket of air 25 of FIG. 5. It will be apparent that the expansion and contraction of the trapped air 25a slightly alters the distance between the attracting magnets 20 and 21, but this has not impaired the efficiency of such reservoirs in practice. Suitable dimensions for the reservoir and for the followers 15a and 26 are given above in relation to FIG. 5. Suitable data for the magnets 20 and 21 are given in relation to FIG. 3.

In assembly the follower 15a is inserted into the reservoir, the latter filled with ink, and the writing extremity applied. The secondary follower 26 is then pushed partly into the rear end of the reservoir and sealing liquid applied to its periphery in the annulus 24. The secondary follower is then pushed farther into the reservoir until the gap between the two magnets is between 5 and 6 mm. During this latter operation the excess of air trapped at 25a escapes past the annulus 24 and the sealing liquid then abruptly reforms the seal around the follower 26 so that the remaining air is trapped under pressure at 25a.

FIG. 7 and the enlarged view in FIG. 8 illustrate an improvement which utilizes an "air-spring" 17c. In FIG. 7, a follower 15c and a secondary follower 28 are drawn toward one another by an "air-spring" 17c (a pocket of trapped air at a pressure below atmospheric). The follower 15c is formed with a longitudinally extending cavity and the secondary follower 28 has a reduced diameter end 32 which is a close but easy sliding fit in the cavity in the follower 15c, this fit being such that the annular gap or clearance between the two is approximately one-half of that between the follower peripheries and the reservoir wall. A liquid seal 29 exists between the fitting portions of the follower 15c and the secondary follower 28, as shown in FIG. 8. This liquid seal isolates the air-spring 17c from the trapped air in the pocket 25b between the two followers.

The trapped air 25b is above atmospheric pressure by an amount exactly equal in magnitude to the capillary pressure of the annular menisci 16, 30 which form the boundaries of said trapped air. This positive air pressure tends to separate the secondary follower 28 from the follower 15c. However, the act of separation expands the air 17c which is trapped as an air-spring. This expanded air 17c, being below atmospheric pressure, tends to draw the secondray follower 28 back towards the follower 15c. A condition is then achieved where these two followers, 28 and 15c, are in equilibrium when the respective air pressures at 17c and 25b balance their resultant thrusts. Design considerations are simplified if the cross-sectional area of the cylindrical air space 17c is equal to the cross-sectional area of the annular air space 25b. With this condition fulfilled, equilibrium is obtained when the positive pressure of the trapped air at 25b is equal in magnitude to the pressure depression of the air-spring 17c (both said pressures being measured from datum of atmospheric pressure).

The pressure differential across the air-spring liquid seal 29 is equal to the algebraic difference of the respective pressures at 17c and 25b, i.e., this differential is twice the positive pressure at 25b. Hence, the reason for stipulating that the annular clearance containing the liquid seal 29 should be one-half of the annular clearance between the follower peripheries and the internal reservoir wall.

Both the air-spring 17c and the trapped air 25b expand and contract in sympathy with each other under the influence of atmospheric temperature and pressure variations, with the result that the trapped air 25b is maintained at a positive pressure sufficient to ensure a small concave meniscus 16.

In the embodiment illustrated in FIGS. 7 and 8 suitable diameters are 5 mm. for the reservoir, and 4.9 mm. for the two followers 15c and 28. These dimensions are designated $D_1$ and $D_2$, respectively, in FIG. 8. The sealing liquids 24 and 29 have surface tensions substantially the same as that of the ink.

Employing the notation shown in FIG. 8 other relevant dimensions may be as follows:

$L$— 3 mm.
$L_1$— 5 mm.
$l$— 2mm.
$d_1$— 3.5 mm.
$d_2$— 3.55 mm.

In assembly the follower 15c and the secondary follower 28 are positioned as shown in FIG. 8 and a drop of sealing liquid is placed in the annular clearance 29. The reservoir is then filled with ink, the writing extremity is attached, and the follower assembly shown in FIG. 8 is pushed into the rear end of the reservoir until the follower 15c is immersed in the ink. A drop of sealing liquid is then placed in the annular clearance between the secondary follower 28 and the reservoir wall. This sealing liquid is drawn into this annulus by capillary force and at the same time pressurizes the air which is trapped at 25b. The air-spring 17c expands until equlibrium is attained.

FIG. 10 of the drawings shows a typical large capacity liquid dispenser incorporating a sealing device according to the invention. The capacity of the reservoir shown in FIG. 10 may be more than 100 times larger than the normal capacity of reservoirs for ball-point pens. Although the sealing device illustrated in FIG. 10 is of the type described in connection with FIG. 5 of the drawings, any of the various forms of sealing devices according to the invention as described above with respect to FIGS. 1–7 can be used with a large capacity reservoir.

In the embodiment shown in FIG. 10, a large capacity dispenser 100 having an outlet 33 and a stopcock 34 is provided with a dual-piston seal comprising a follower piston 115 and a secondary piston 123 urged together by a tension spring 117b, a pocket of air at greater than atmospheric pressure being trapped between the pistons. Air vents 131 are provided at the top of the dispenser to admit air as the pistons descend when liquid is withdrawn. This reservoir seal operates to prevent leakage in the same manner as does the seal of FIG. 5.

Advantages of this construction are that the liquid does not come into contact with air, even when the dispenser is partially empty. Nor will leakage occur in any attitude of the dispenser (e.g., in normal handling or when fixed to an aircraft), or widely varying conditions of the gravitational force (e.g., extreme altitude or even outer space).

FIG. 10 also illustrates how the invention may be used as a seal for a liquid vessel to prevent, for example, a volatile or toxic liquid from coming into contact with the atmosphere while maintaining the contents of the reservoir at the pressure of the surroundings, e.g., atmospheric pressure.

In each embodiment according to this invention the forward end of the follower (i.e., that end which is presented to the ink in the reservoir) may be domed or made conical so as to reduce the possibility of air being trapped in the reservoir.

The embodiments illustrated in FIGS. 1 and 2 permit of the provision of a reservoir of the kind specified, which is vented or subject to atmosphere but in which the liquid can be stored and/or from which liquid can be dispensed at substantially constant and lower-than-atmospheric pressure. All the embodiments herein described permit of the construction of a reservoir in which the liquid surface is prevented from making indiscriminate movements (splashing, foam formation, etc.) under the influence of the forces acting on it in normal use (gravity, shock, inertia, etc.). They also permit the instrument to be made up of parts which can be made easily and cheaply from suitable materials (especially plastics) and/or easily assembled by mass production methods. Furthermore they permit of the construction of a reservoir (and especially the embodiments illustrated in FIGS. 5, 6 and 7 and 8) for highly viscous and opaque liquids in which the liquid content of the reservoir can be made visible from outside. The embodiments illustrated in FIGS. 5, 6, and 7 and 8 also permit of the construction of a reservoir in which the liquid to be dispensed is completely protected from contact with, or contamination by, the constituents of the gas surrounding the reservoir or instrument.

We claim:
1. A liquid reservoir having a seal comprising a conduit opening to the exterior of the reservoir of greater-than-capillary cross-sectional area, piston means having a bulk density approximately the same as that of a liquid contained in the reservoir slidable within the conduit and having a peripheral shape similar to but slightly smaller than that of the inside surface of the conduit so as to provide a space of capillary dimensions between the adjacent surfaces of the piston means and the conduit, and means effective at least in the horizontal orientation of a reservoir conduit and under all conditions of ambient temperature and pressure occurring in normal use for urging the piston means in the longitudinal direction of the conduit in a manner tending to thrust it out of a liquid in the conduit with sufficient force to balance any forces tending to draw the piston means into a liquid in the conduit, thereby preventing seepage of liquid through the space between the piston means and the conduit, said urging means including an element separate from said piston means with respect to which the piston means is movable, along with means applying a force between the element and the piston means.

2. A liquid reservoir according to claim 1 wherein said force applying means comprises a compression spring extending from the piston means in a direction toward the interior of the reservoir, an abutment portion of the reservoir constituting said element separate from the piston means, said spring abutting said portion.

3. A liquid reservoir according to claim 1 wherein said force applying means comprises a tension spring extending from the piston means in a direction away from the interior of the reservoir, a spring support portion of the reservoir constituting said element separate from the piston means, said spring being attached to said portion.

4. A liquid reservoir according to claim 1 wherein the force applying means comprises permanent magnet means.

5. A liquid reservoir according to claim 4 wherein the permanent magnet means comprises a first magnet mounted toward the outer end of the reservoir conduit with respect to the piston means and having one pole oriented toward the piston means and a second magnet carried by the piston means having its unlike pole oriented toward the first magnet.

6. A liquid reservoir according to claim 4 wherein the permanent magnet means comprises a magnet mounted toward the outer end of the reservoir conduit with respect to the piston means and wherein the piston means includes a portion of magnetically attractable material.

7. A liquid reservoir according to claim 1 including a liquid seal formed by a body of liquid having a meniscus between the adjacent surfaces of the first-mentioned piston means and the conduit wherein the element separate from the first-mentioned piston means with respect to which that piston means is movable comprises second piston means slidable within the conduit and located outwardly from the first-mentioned piston means, and including seal means forming a seal between the second piston means and the conduit and a quantity of fluid enclosed within the conduit between the first-mentioned piston means and the second piston means, the means applying a force between the element and the first-mentioned piston means comprising means urging the first-mentioned piston means and the second piston means together so as to raise the pressure of the enclosed fluid above the pressure of the liquid forming the seal between the first-mentioned piston means and the conduit.

8. A liquid reservoir according to claim 7 wherein the means for urging the first and second piston means together comprises a tension spring extending between the two piston means.

9. A liquid reservoir according to claim 7 wherein the means for urging the first and second piston means together comprises permanent magnet means.

10. A liquid reservoir according to claim 9 wherein the permanent magnet means comprises a first magnet carried by the first piston means having one pole oriented toward the second piston means and a second magnet carried by the second piston means having its opposite pole oriented toward the first piston means.

11. A liquid reservoir according to claim 7 wherein one of the piston means is formed with a cavity and the other piston means includes a plunger slidable into the cavity and also including sealing means between the plunger and the wall of the piston means forming the cavity and a second quantity of fluid within the cavity at a pressure below that of the first quantity of fluid so as to urge the two piston means together.

References Cited by the Examiner

UNITED STATES PATENTS 2,606,529    8/1952    Wagner _____ 120—42.4

FOREIGN PATENTS 688,891    3/1953    Great Britain.
695,861    8/1953    Great Britain.

EUGENE R. CAPOZIO, *Primary Examiner.*

GEORGE A. NINAS, JR., JEROME SCHNALL, JOSEPH D. BEIN, NORTON ANSHER, *Examiners.*